United States Patent [19]

Knoll

[11] Patent Number: 5,791,597
[45] Date of Patent: Aug. 11, 1998

[54] ENERGY ATTENUATION SYSTEM

[75] Inventor: Frank Knoll, Huntington Station, N.Y.

[73] Assignee: East/West Industries, Inc., Ronkonkoma, N.Y.

[21] Appl. No.: 668,630

[22] Filed: Jun. 19, 1996

Related U.S. Application Data

[60] Provisional application No. 60/000,243 Jun. 22, 1995.
[51] Int. Cl.⁶ ..................................................... B64D 11/06
[52] U.S. Cl. .................. 244/121; 244/122 R; 244/138 R; 297/216.17; 297/216.1; 280/728.1
[58] Field of Search .................. 244/121, 118.5, 244/118.6, 122 R, 122 AB, 122 B, 138 R, 141; 297/216.1, 216.17; 280/728.1

[56] References Cited

U.S. PATENT DOCUMENTS

| | | | |
|---|---|---|---|
| 3,042,347 | 7/1962 | Halsey | 244/141 |
| 3,050,278 | 8/1962 | Gardner et al. | 297/216.1 |
| 3,156,442 | 11/1964 | Pourchet | 244/141 |
| 4,474,347 | 10/1984 | Hazelsky | 244/122 R |
| 5,039,162 | 8/1991 | Yoshida | 244/141 |
| 5,297,761 | 3/1994 | Kendall, Jr. et al. | 244/141 |
| 5,451,094 | 9/1995 | Templin et al. | 297/216.17 |

FOREIGN PATENT DOCUMENTS

| | | | |
|---|---|---|---|
| 4118300 | 12/1992 | Germany | 244/138 R |
| 842370 | 7/1960 | United Kingdom | 244/138 R |
| 2 228 867 | 9/1990 | United Kingdom . | |

OTHER PUBLICATIONS

Simula, Inc., Aircraft Survival Guide, Jun. 1980, vol. IV, chapter 5, pp. 106–124 Proceedings of the Thirty Second Annual Symposium Safe Association, SAFE Association, 1994, pp. 68–70.

*Primary Examiner*—Galen L. Barefoot
*Attorney, Agent, or Firm*—Cahn & Samuels, LLP

[57] ABSTRACT

An energy attenuation system for absorbing at least a portion of the force impulse imparted to an occupant of an aircraft during a crash. The energy attenuation system comprises a seat and an air bag module. The air bag module includes an air bag positioned and deployable below the seat. The air bag allows the seat and its occupant to move in the direction of the applied impact forces under a controlled stroking force. Accordingly, the occupant may be exposed to a force having a magnitude substantially less than the magnitude of the force on the aircraft.

20 Claims, 3 Drawing Sheets

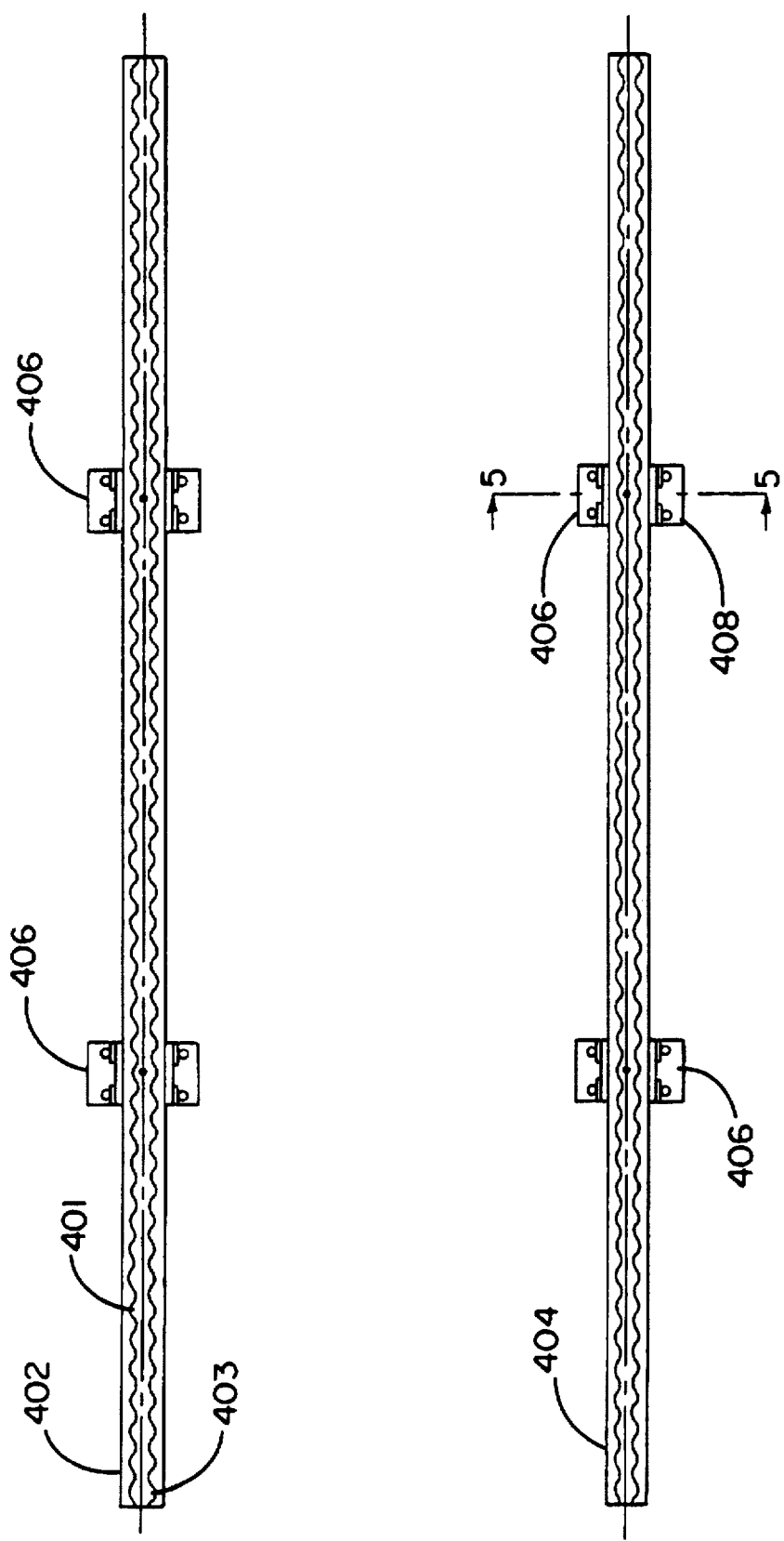

ENERGY ATTENUATION SYSTEM

This application claims benefit to USC § 119(e) of my U.S. Provisional Pat. No. 60/000,243 filed Jun. 22, 1995.

BACKGROUND OF THE INVENTION

1. Field of the Invention

The present invention relates to an energy attenuation system, and more particularly, to an energy attenuation system comprising a seat/air bag combination for use in aircraft.

2. Discussion of the Prior Art

A multitude of restraint devices and energy attenuation devices are currently utilized in military and commercial aircraft seating for crew and passenger safety. Restraint devices such as safety belts and harnesses are, as the name suggests, intended to restrain the movement of the individual occupying the seat, thereby tending to prevent possible injury caused by sudden movements. More advanced restraint systems include inertial reels and pretensioning devices incorporated into the safety belt and harness arrangements. Additionally, inflatable restraint systems, such as air bags, have been utilized in a manner similar to the manner in which they are utilized in automobiles. Energy attenuation devices, on the other hand, are utilized to attenuate the forces imparted to the individuals in the aircraft during rapid deceleration to a survivable and tolerable level.

Energy attenuation devices utilize the forces generated by the rapid deceleration of the aircraft to perform work, i.e., translate at least a portion of the forces generated over a predetermined distance, commonly referred to as the stroking distance. Accordingly, the forces acting upon the individuals in the aircraft are reduced by the amount expended in performing the work. Energy attenuation devices for aircraft seating are typically built into the seat. More specifically, the energy attenuation devices are integrated into the seat mounting mechanism. The particular energy attenuation device should decelerate the occupant of the seat in the most efficient manner possible while maintaining the loading environment within the limits of human tolerance. Basically, energy attenuation devices allow the seat to move in the direction of the applied force caused by the rapid deceleration under a controlled stroking force, i.e., the force required to do the work. By allowing the seat to be displaced in the direction of the applied force, the occupant of the seat is exposed to a deceleration level which is lower than the aircraft deceleration level.

The plastic deformation property of certain materials, for example metals, provides for a reasonably efficient means for attenuating energy. Consequently, many of the currently available energy attenuation devices utilized in aircraft exploit this property. For example, in a wire or strap bending device, a portion of the force generated during rapid deceleration is utilized to bend a metal wire or strap around a die or roller. Other examples of energy attenuating devices exploiting this property include inversion tube devices, cable elongation devices, rod pull through devices, and crushing honeycomb devices. In the inversion tube device, a portion of the force generated is utilized to turn a metal tube inside out. In cable elongation devices, the force is utilized to stretch a length of cable. In rod pull through devices, the force is utilized to pull a hardened rod through a cylinder, thereby enlarging the diameter of the cylinder. In crushing honeycomb devices, the force is utilized to crush a honeycomb structure. Traditional devices such as shock absorbers and torque tubes are also currently utilized.

Although the above described energy attenuators are all effective in reducing the force imparted to the occupants of the aircraft during rapid deceleration, the amount of attenuation is limited. Typically, present energy attenuation arrangements are only capable of withstanding a deceleration of approximately 8 g before collapse. In addition, out of necessity, these energy attenuators are designed for the mythical average person. Consequently, individuals not fitting into this category, i.e., lightweight and heavyweight individuals, will not benefit from the maximum attenuation levels achievable by these energy attenuators.

SUMMARY OF THE INVENTION

In accordance with a first aspect, the present invention is directed to an energy attenuation system for aircraft seating. The energy attenuation system comprises a seat and an air bag module. The air bag module includes an air bag which is positioned and deployable below the seat for at least partially attenuating the forces generated during a rapid deceleration of the aircraft caused, for example, by a collision. At the onset of a collision, the air bag may be rapidly deployed to fill the space between the seat and the floor of the aircraft, thereby cushioning the seat and the occupant of the seat against the full force of the impact. The energy attenuation occurs as the forces generated by the rapid deceleration of the aircraft are imparted through the seat and the occupant of the seat to the air bag, thereby deflating the air bag at a controllable rate and over a predetermined stroking distance. Essentially, the total force acting upon the occupant of the seat may be reduced by the energy required to deflate the air bag.

In accordance with a second aspect, the present invention is directed to an energy attenuation system for aircraft seating. The energy attenuation system comprises a seat, a sensor, and an air bag module. The sensor is positioned in proximity to the seat and detects an impulse force indicative of a collision. Upon detection of a collision, the sensor transmits a collision signal to the air bag module. The air bag module includes an air bag which is positioned and deployable below the seat for at least partially attenuating the forces generated during a rapid deceleration of the aircraft.

In accordance with a third aspect, the present invention is directed to a method for attenuating forces imparted to an occupant of an aircraft during a crash. The method comprises positioning an air bag module below a seat in the aircraft, inflating an air bag of the air bag module at predetermined rates and pressures upon the detection of a collision, and deflating the air bag at a controllable rate to absorb the forces.

The exemplary energy attenuation system of the present invention provides for reducing the number of potential injuries and fatalities of both crew and passengers during potentially survivable aircraft crashes by reducing the impact forces imparted to the occupants of the aircraft. The exemplary energy attenuation system may be utilized by effectively and efficiently absorbing impact forces imparted in the vertical, fore and aft, and lateral directions simultaneously. The exemplary energy attenuation system may automatically adjust to varying loads such that individuals having different body masses may be equally protected.

The exemplary energy attenuation system of the present invention provides for improved crash protection by the incorporation of an energy attenuating mechanism, i.e., an air bag module, into the seating arrangements of both military and commercial aircraft. The exemplary energy attenuation system attenuates the high magnitude forces generated by the rapid deceleration of an aircraft during a crash without the need for structural modifications to the aircraft. By utilizing an air bag having a large deployed surface area, for example, larger than the area of the bucket portion of the seat, the pressure exerted by the air bag on the floor of the aircraft during deployment is greatly reduced. Accordingly, no reinforcement is required in the floor of the aircraft to ensure the structural integrity of the aircraft.

The exemplary energy attenuation system of the present invention comprises a reliable, safe, lightweight, and simple design which may be easily installed on existing aircraft as is, or with minor modifications to seat attachment arrangements. The exemplary energy attenuation system includes a mechanical sensor unit for determining whether a crash is imminent. The mechanical sensor is extremely accurate and is operable without external power from the aircraft. Therefore, the energy attenuation system may remain operable during a total power failure in the aircraft. In addition, since the sensor unit is entirely mechanical, no electrical conduit is needed for supplying power. The exemplary energy attenuation system is compact and easily positioned beneath aircraft seats without interfering with existing aircraft structures and functions. The air bag module may be utilized in conjunction with all existing seats regardless of how the seats are attached to the aircraft, i.e., floor or wall mounted. In addition, the exemplary energy attenuation system does not present obstructions hindering occupant emergency egress from the aircraft.

BRIEF DESCRIPTION OF THE DRAWINGS

FIG. 4 is a diagrammatic representation of a crashworthy seat track assembly seat mounting mechanism of the present invention.

DESCRIPTION OF THE PREFERRED EMBODIMENTS

As used herein, the term aircraft shall be understood to include all commercial and military airplanes and helicopters. Generally, in commercial airplane crashes, the airplane glides at least partially toward the ground rather than simply "falling" out of the sky. Consequently, the impact force encountered by the occupants of the airplane have horizontal as well as vertical force components. However, in a typical airplane crash, the vertical force component usually has a larger magnitude than the horizontal force component. In military airplane crashes, there is the potential for the airplane to fall out of the sky, for example, in a flat spin. In addition, certain military airplanes, such as fighter planes, are highly maneuverable, and as such are inherently unstable. Accordingly, these airplanes tend to fall rather than glide during a crash scenario. Helicopters, unlike airplanes, generally do not glide at all, therefore, the impact force will essentially be in the vertical direction. Accordingly, the exemplary energy attenuation system of the present invention may be effectively utilized in helicopter crashes and to a certain extent airplane crashes to attenuate the collision forces.

In an exemplary embodiment, the energy attenuation system of the present invention comprises an air bag module including a sensor unit, an air bag inflator, and an air bag positioned and deployable beneath an aircraft seat. Accordingly, improved crash protection may be achieved because the air bag allows the seat to move in the direction of the applied impact force under a controlled stroking force. By allowing the seat to displace in the direction of the applied impact force, the occupant of the seat is exposed to a deceleration level which may be lower than the aircraft deceleration level.

Aircraft seats and seat mounting mechanisms vary from aircraft to aircraft. For example, some seat mounting mechanisms allow the seat to move in the vertical direction while others hold the seat in a fixed position. The seats capable of movement in the vertical direction are typically equipped with energy attenuation devices, such as those previously described, which are capable of absorbing a portion of the forces caused by a crash. The seats which are held in a fixed position, however, are also capable of movement in the vertical direction and have "built-in" energy attenuation devices. The force in a typical aircraft crash may be of sufficient magnitude to cause the seat mounting mechanisms to be displaced in the vertical direction, i.e., buckle under the load. However, as explained above, the plastic deformation properties of certain materials, e.g., metals, provides for a reasonably efficient means of attenuating energy. Consequently, even a seat which is held in a fixed position is capable of movement in the vertical direction, and this movement provides at least some energy attenuation.

Figure 5:
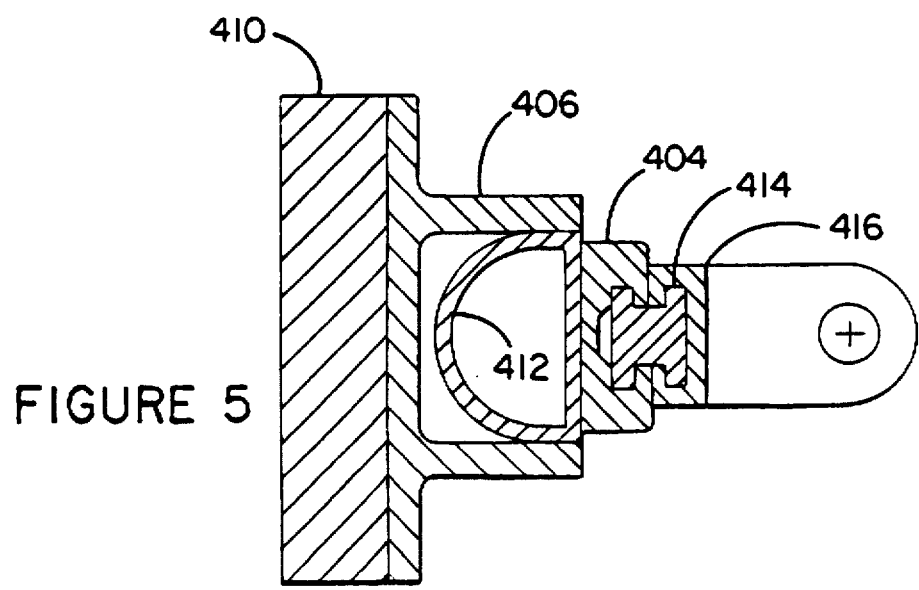
FIG. 5 is a sectional view of the crashworthy seat track assembly seat mounting mechanism of the present invention.

FIG. 4 is a diagrammatic representation of an exemplary crashworthy seat track assembly seat mounting mechanism. The crashworthy seat track assembly comprises upper and lower tracks or rails 402,404 which are mounted to the bulk head sections of the aircraft via attachment fittings 406. The attachment fittings 406 may comprise brackets that secure the rails 402,404 to the walls of the aircraft. The brackets 406 may be attached to the walls of the aircraft by any suitable means, for example, by bolts 408. The rails 402,404 run longitudinally along the length of the aircraft such that seats may be positioned at appropriate spacing along the walls of the aircraft. The rails 402,404 include a plurality of bore holes 401 provided in a longitudinal undercut channel 403. The bore holes 401 may be utilized to secure a restraining fitting in position as is explained subsequently. The seats may be attached by the restraining fittings which may be removably mounted to the rails 402,404. FIG. 5 illustrates a sectional view of the lower rail portion of the exemplary crashworthy seat track assembly taken along section line 4—4. The upper rail portion may be identical to the lower rail portion.

As illustrated in FIG. 5, a spacer 410 may be utilized between one or both of the rails 402,404 and the aircraft walls to compensate for the curvature of the aircraft walls. The attachment fitting 406 comprises a partially tube-shaped member 412 which is utilized to reduce any bending forces experienced by the seat mounting mechanism. The tube-shaped member 412 may be attached to the attachment fitting 406 by any suitable means, for example, it may be welded thereto. The rail 404 may be attached to a flat portion of the tube-shaped member 412 by any suitable means, for example, by welding or bolts. Although illustrated as separate components, the rail 404, the attachment fitting 406, and the tube-shaped member 412 may be formed as an integral structure out of any material suitable for supporting the loading demands. In a preferred embodiment, all three elements are formed from aluminum to reduce weight on the aircraft.

As stated above, the rails 402,404 are designed with a plurality of bore holes 401 provided in a longitudinal undercut channel 403 for mating with and securing a restraining fitting. FIG. 5 illustrates a cross-sectional view of the restraining fitting 414 mounted in the lower rail 404. The restraining fitting 414 may be mounted in the rail 404 at any portion along the rail 404. As shown in cross-section, the restraining fitting 414 is shaped substantially like an I-beam. The end of the restraining fitting 414 that fits in the rail 404 is appropriately shaped to match the openings in the rail 404. For example, the opening in the lower rail 404 may be round as illustrated in FIG. 4. In a preferred embodiment, however, the openings are square as illustrated in the upper rail 402 shown in FIG. 4 for added strength. The other end of the restraining fitting 414 is connected to a bracket 416 that connects to the seat by a bolt or quick release pin. The restraining fitting 414 is a device that includes at least two protrusions that engage with the plurality of bore holes 401 and undercut channel 403 of the rail 404. The restraining fitting 414 is designed to enter the rail 404 where the protrusions correspond to the bore holes 401 and then slide and lock into a position where the protrusions engage the walls of the undercut channels 403, thereby securing the seat into position.

In a typical aircraft crash, the occupants of the aircraft experience a force generated by a deceleration having a magnitude in the range of 30 g to 50 g, and directed in a substantially vertical orientation. This force is an impulse force having a duration of approximately one hundred eighty (180) milliseconds. Accordingly, an energy attenuation system should be able to attenuate this force impulse in a time frame less than the duration of the force impulse. FIG. 1 is a diagram illustrating the sequence and timing of operation of an exemplary embodiment of the energy attenuation system of the present invention.

Figure 1A:
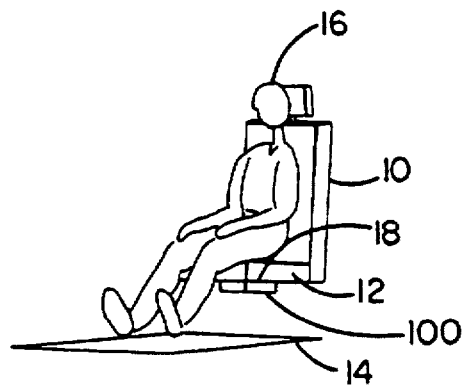
FIG. 1 is a diagrammatic representation of the sequence of operation of the energy attenuation system of the present invention.

FIG. 1a illustrates an occupant 16 sitting in an aircraft seat 10 comprising the air bag module 100. As illustrated, the air bag module 100 may be mounted to the underside of the seat bucket 12, however, the air bag module 100 may be mounted in any suitable location, including on the floor 14 of the aircraft beneath the seat 10. Although the air bag module 100 may be positioned in different locations, the air bag (not illustrated in FIG. 1a) preferably is deployable between the seat and the floor 14. The air bag module 100 may be mounted to the seat 10 by fasteners, such as nuts and bolts (not illustrated), however, other mounting means may be utilized. In a preferred embodiment, a molded pocket or bracket 18 may be integrally formed with the aircraft seat 10 to secure the air bag module 100 to the aircraft seat 10. The mounting device should have sufficient strength to withstand the initial impact, i.e., remain attached to the seat 10 for the time necessary for the air bag to deploy. Prior to the detection of a crash, the air bag is securely stowed in the air bag module 100.

Figure 1B:
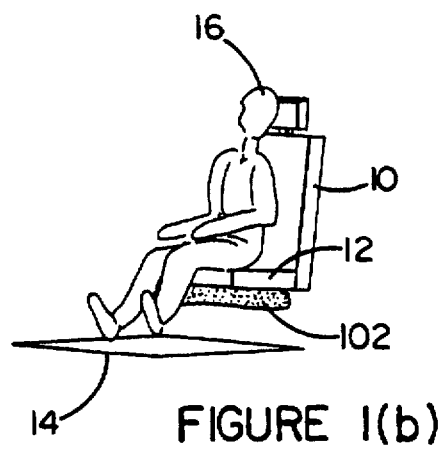

Once a crash is detected by a sensor unit (not illustrated in FIG. 1), the sensor unit initiates a chain reaction in the air bag inflator (not illustrated in FIG. 1), thereby causing the air bag 102 to inflate as illustrated in FIG. 1b. The sensor unit comprises an electromechanical device or a mechanical device which is sensitive to a predetermined force. Upon detection of this force, the sensor unit initiates the inflation process within fifteen (15) to twenty (20) milliseconds, and preferably in less than ten (10) milliseconds.

Figure 1C:
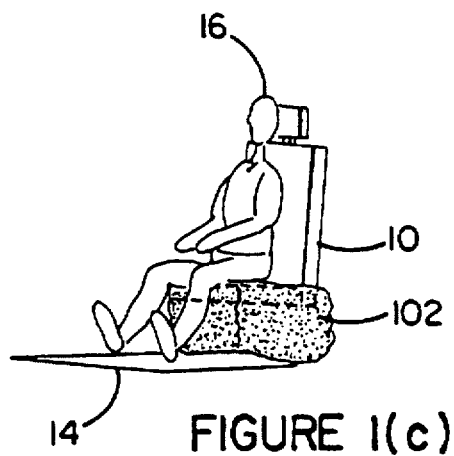

For effective energy attenuation, the air bag 102 should be fully inflated within twenty (20) to sixty (60) milliseconds, and preferably within twenty (20) milliseconds or less. The fully inflated air bag 102 may occupy the entire volume between the underside of the seat bucket 12 and the floor 14 of the aircraft. Additionally, the air bag 102 preferably at least partially envelops the occupant 16 to absorb energy in the lateral and fore/aft directions. FIG. 1c illustrates the fully inflated air bag 102.

Figure 1D:
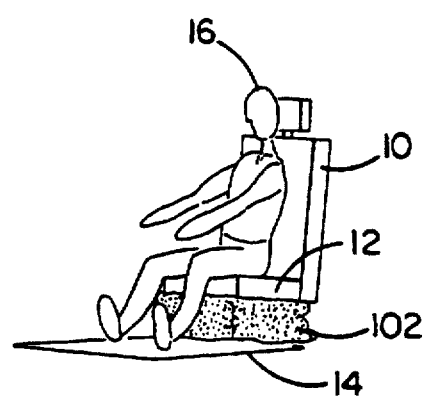
Figure 1E:
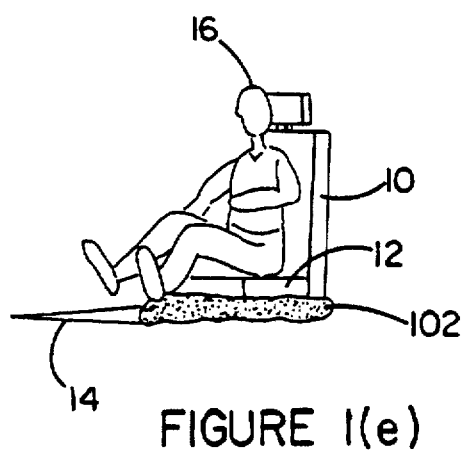

The crash forces acting upon the occupant 16 forces the occupant 16 and the seat 10 down into the fully inflated air bag 102. The air bag 102 allows the seat 10 and its occupant 16 to move in the direction of the applied impact force under a controlled stroking force. By allowing the seat 10 to displace in the direction of the impact force, the occupant 16 may be exposed to a deceleration magnitude which is much less than the aircraft deceleration magnitude. Air bag deflation may be controlled by precise venting of the gas in the air bag 102 to achieve the controlled stroking force. Deflation of the air bag 102 starts within one hundred twenty-five (125) to one hundred thirty (130) milliseconds, and preferably within one hundred twenty (120) milliseconds as is illustrated in FIG. 1d. Maximum crash deceleration generally occurs between one hundred forty (140) and one hundred fifty (150) milliseconds from the initial impact. At this time, the air bag 102 should be at least half-way deflated, as illustrated in FIG. 1e.

Figure 1F:
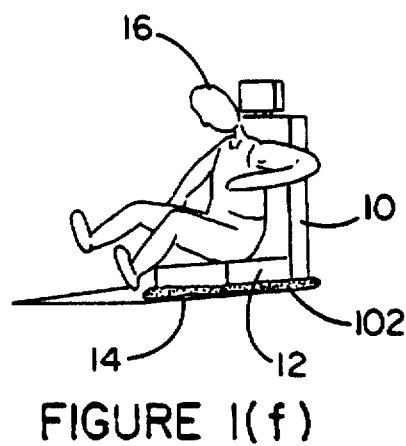

The complete deflation of the air bag 102 should coincide approximately with the end of the crash impulse to ensure maximum energy attenuation. Accordingly, the air bag 102 may be completely deflated between one hundred forty (140) and one hundred fifty (150) milliseconds, and preferably not in less than one hundred sixty (160) milliseconds. FIG. 1f illustrates the seat 10 resting upon the floor 14 of the aircraft with the completely deflated air bag 102 therebetween. With the air bag 102 fully deflated, the occupant 16 may easily and rapidly exit from the downed aircraft.

Figure 2:
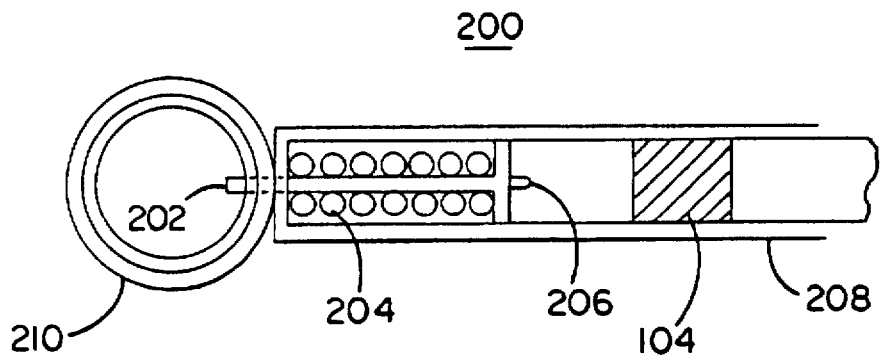
FIG. 2 is a diagrammatic representation of a sensor unit of the energy attenuation system of the present invention.

FIG. 2 is a diagrammatic representation of an exemplary sensor unit 200. The sensor unit 200, as stated above, may comprise an electro-mechanical sensor or a mechanical sensor. In the illustrated exemplary embodiment, the sensor unit 200 comprises a mechanical shear-pin sensor suitable for single point operation. The exemplary sensor unit 200 comprises a shear pin 202, a pre-loaded bias spring 204, a firing pin 206, and a housing 208. The shear pin 202 may be connected at a first end to the aircraft seat 10 structure utilizing any suitable connecting means. For example, the shear pin 202 may be connected to the aircraft seat structure via a ring 210. Alternatively, the shear-pin 202 may be connected directly into the seat 10 support structure. The shear-pin 202 may be connected at a second end to the firing pin 206. The shear pin 202 may be formed from any suitably soft metal such as aluminum and brass. The firing pin 206 is held in a fixed position by the shear pin 202 in opposition to the force of the pre-loaded bias spring 204. The impulse force from the crash acts upon the shear pin 202 causing it to separate from the seat structure, thereby releasing the firing pin 206. Once the shear pin 202 separates from the seat structure, the pre-loaded bias spring 204 urges the firing pin 206 to accelerate through the housing 208 until it makes contact with a percussion cap detonator 104, thereby initiating a chain reaction for inflating the air bag 102. A more complete description of the percussion cap detonator 104 and air bag 102 operation is given subsequently. A mechanical sensor is preferable for a number of reasons, including simplicity, low failure rate, and it does not require external power which would necessitate adding additional electrical cabling.

In an alternate exemplary embodiment, the sensor unit may include a mechanical spring-mass sensor suitable for single point operation. The exemplary alternate sensor unit may comprise a hollow tube, a ball, a lever, a bias spring, a shaft, and a firing pin. The ball may be snugly positioned in the hollow tube and restrained in this position by the lever, which is counter-balanced by the bias spring, and a degree of air damping and friction. The impulse force from the crash acts upon the ball and causes the ball to move in the direction of the applied force through the hollow tube. As the ball moves through the hollow tube, it rotates the shaft. The shaft is a D-shaped shaft which restrains the firing pin. Accordingly, if the shaft is fully rotated, the firing pin is released and makes contact with a percussion cap detonator, thereby initiating a chain reaction for inflating the air bag, which is discussed in detail subsequently.

Individual sensor units may be utilized for each seat 10. The sensor units may be mounted in remote locations, but are preferably mounted within the air bag module 100 under each seat 10. Individual sensor units are utilized in order to achieve the maximum energy absorption. As explained above, the drawback associated with current energy attenuation devices is that they are designed for the average person. However, in utilizing individual sensor units preset to detect a predetermined deceleration caused by the crash impulse force, occupants 16 having different masses will cause the air bag modules 100 to initiate inflation of the air bags 102 at times corresponding to their masses. In the exemplary embodiments, the sensor units are set to initiate air bag inflation upon the sensing of an acceleration in the range of 5 g to 6 g, and preferably an acceleration of 3 g. The acceleration magnitude should be low enough for fast response, but high enough to prevent accidental inflation by a heavier occupant 16 sitting down very abruptly, i.e., falling into the seat 10. Calibration of the sensor unit 200 illustrated in FIG. 2 may be accomplished by selecting a shear pin 202 that will shear under the pre-selected load, i.e., 3 g. Calibration of the alternate sensor unit, may be accomplished by selecting the mass of the ball, the spring constant of the bias spring, the damping and friction coefficients of the materials utilized, and the travel distance of the ball, i.e., tube length. Other devices may be utilized to sense the collision forces, for example, accelerometers.

As stated above, upon detection of a crash, the sensor unit 200 initiates a chain reaction for inflating the air bag 102. The sensor unit 200 communicates with the air bag inflator unit 106 (illustrated in FIG. 3) for initiating air bag inflation. There are two well known methods for inflating air bags. In the first method the air bag may be inflated by an air bag inflator that generates large quantities of hot gases by igniting a combustible material. This method shall be referred to hereafter as the "hot gas" inflation method. In the second method, the air bag may be inflated using a source of compressed gas. This method shall be referred to hereafter as the "compressed gas" inflation method.

The compressed gas inflation method requires a receptacle of gas stored at a very high pressure, which may be discharged into the air bag as soon as a crash is detected. In order to obtain a sufficient volume of gas for inflating the air bag, however, a relatively large receptacle of gas at pressures of one thousand (1,000) psi or greater may be required. To ensure opening of the gas receptacle in the short time interval required to maintain occupant safety, explosive units are frequently utilized for increasing the pressure in the receptacle and thereby bursting a diaphragm or cutting through a structural portion of the receptacle. The explosive units have a number of undesirable effects such as the production of debris accelerated to high velocity during the explosion and extreme heat generation. Any debris must be filtered out to minimize the likelihood of damaging the air bag and endangering occupants. Accordingly, a typical air bag inflator for use in compressed gas inflation includes a filter for removing the debris.

The hot gas inflation method employs a gas generant that typically includes a material which burns very rapidly once it is ignited and generates large quantities of hot gases which must be cooled and filtered before it enters the air bag.

Figure 3:
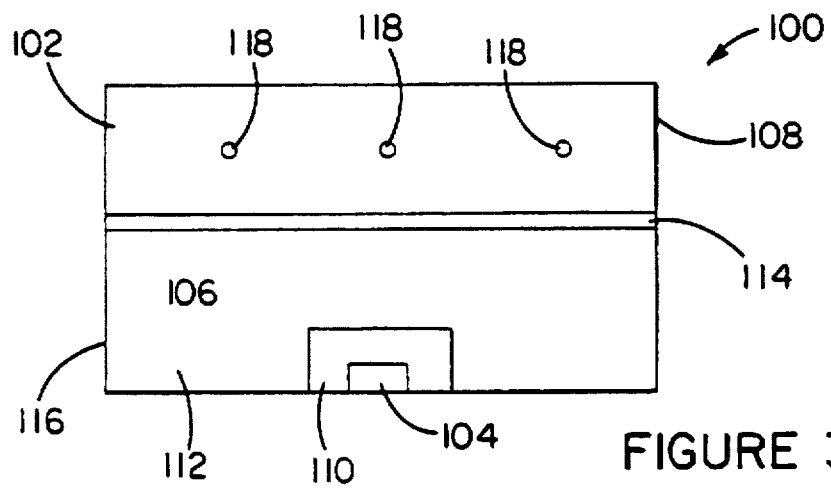
FIG. 3 is a diagrammatic representation of an air bag module of the energy attenuation system of the present invention.

In the exemplary embodiment, the hot gas inflation method is utilized because of its speed, and because it makes for a lighter air bag inflator unit 106. It is important to note that weight is always a critical factor in aircraft design. Consequently, any devices placed on the aircraft should be as lightweight as possible. FIG. 3 is a diagrammatic representation of an exemplary air bag module. The exemplary air bag module 100 comprises a casing 108, the air bag 102, and the air bag inflator unit 106 which is connected to the sensor unit 200. The air bag inflator unit 106 comprises the percussion cap detonator 104, which is commonly referred to as a squib, a booster compartment 110 having a booster material contained therein, a gas generant material compartment 112 having a gas generant contained therein, and a filter 114 all arranged in a single housing 116. The housing 116 preferably is cooperatively arranged with the air bag 102 to direct the generated gases from the air bag inflator unit 106 into the air bag 102. The air bag inflator unit 106 may be constructed from a durable, lightweight material such as aluminum, titanium, or certain stainless steels in order to reduce the weight. Preferably, the air bag inflator unit 106 comprises aluminum. The air bag inflator unit 106 controls air bag inflation speeds and pressures by adjusting air bag inflator unit parameters.

As stated above, in the exemplary embodiment, the firing pin 206 of the sensor unit 200 makes contact with the percussion cap detonator 104, thereby initiating a chain reaction. The percussion cap detonator 104 comprises an impact ignitable charge similar to the primers utilized in standard ammunition, i.e., bullets. Accordingly, when the firing pin 206 of the sensor unit 200 impinges upon the percussion cap detonator 104, the charge contained therein is ignited. In an alternate embodiment, the squib 104 may comprise a small charge of an electrically ignitable combustible material having leads connected to a sensor unit operable to provide an electrical signal to the squib upon the detection of a crash. For example, the sensor may comprise an electrical switch which completes a low voltage/low current circuit, thereby sending an electrical signal, i.e., current, to the squib via the leads connected thereto. The current causes the leads to heat up thereby igniting a small charge. In the preferred embodiment, the squib comprises a percussion cap detonator including any suitable impact ignitable charge, for example, gunpowder, and may be mounted in direct contact with the booster compartment 110.

The detonation of the squib 104 by the firing pin 206 of the sensor unit 200 ignites the booster material in the booster compartment 110. The booster compartment 110 comprises rapidly combustible material which may be easily ignited by the small charge in the squib 104. Typically, the booster compartment 110 is in direct contact with the gas generant compartment 112. The rapid generation of hot gases from the combustion of the booster material acts to burst the walls of the booster compartment 110 and the gas generant compartment 112, thereby coming into contact with and igniting the gas generant material.

In order to achieve maximum energy attenuation, the air bag 102 should be inflated as rapidly as possible from the initial detection of the crash. Accordingly, the booster material should preferably be easily ignitable by the squib 104 and burn as rapidly as possible. There are many well known booster materials currently utilized in air bag technology. For example, a booster which ignites very rapidly comprises a mixture of boron and potassium nitrate ($BKNO_3$). In the exemplary embodiment, the mixture of boron and potassium nitrate is utilized in powdered form. In powdered form, the surface area of the booster material is increased, thereby increasing the combustion speed of the material.

As is the case with booster materials, there are many well known materials which may be utilized as the gas generant. For example, the gas generant material may comprise any number of known combustible compositions. In the exemplary embodiment, the gas generant comprises a mixture of sodium and nitrogen, commonly referred to as sodium azide ($NaN_3$), formed into small pellets approximately the size of aspirin tablets. The mixture of sodium and nitrogen may also comprise an oxidizer such as copper oxide, nickel oxide, or iron oxide. Alternatively, the sodium azide may be mixed with potassium perchlorate. In the preferred embodiment a composition comprising sodium azide and a stoichiometric amount of copper oxide is utilized. The combustion of the sodium azide liberates large quantities of nitrogen gas under high pressure. For example, tens of grams of sodium azide may liberate between twenty-five (25) to thirty (30) gallons of nitrogen gas. Sodium azide is potentially toxic, however, it is substantially consumed in the reaction, i.e., combustion. The gas generant compartment 112 may comprise a unique configuration, for example, having the geometry of a diffuser, to facilitate the rapid delivery of the nitrogen gas to the air bag 102. The air bag 102 may be fully inflated in forty (40) to sixty (60) milliseconds, and preferably in to thirty (30) to fifty (50) milliseconds utilizing this arrangement.

During the combustion of the gas generant, the temperature of the generated gases, i.e., nitrogen in the exemplary embodiment, may be twelve hundred (1,200) degrees celsius or greater, and the pressure within the gas generant compartment 112 may be three thousand (3,000) pounds per square inch. In addition, undesirable residues may be generated, inducing high velocity fine molten particles of metal and/or reactive oxides which pollute the gas propelled into the air bag 102. Accordingly, gas cooling and filtering may be necessary to ensure occupant 16 safety and to maintain the integrity of the air bag 102. In the exemplary embodiment, a filter 114 may be positioned in the gas flow path between the gas generant compartment 112 and the air bag 102 to filter and/or cool the hot gas inflating the air bag 102. The filtered gas exits the filter 114 and flows under high pressure through air bag inflation ports (not illustrated).

The air bag 102 may be packed into the air bag module 100 in a number of ways. The particular air bag folding pattern may strongly influence bag inflation speed. Currently utilized folding patterns include the accordion fold, the reverse accordion fold, the pleated accordion fold, and overlapping folds. In the exemplary embodiment, the air bag 102 is packed into the air bag module 100 utilizing the reverse accordion fold. The speed of air bag inflation is approximately one hundred (100) miles per hour or greater. Internal tethers (not illustrated) may be utilized to limit bag extensions to a shallower or defined deployment.

As illustrated in FIG. 1, the air bag 102 may be large enough to at least partially surround the occupant 16 of the seat 10 and thereby tend to absorb forces in the lateral and fore and aft directions as well as in the vertical direction. In addition, the floor of many aircraft is not as structurally sound as, for example, the bulkhead. Therefore, if a small surface area air bag were utilized, large forces per unit area, i.e., high pressures, may be transmitted to the floor potentially causing the floor to collapse. One way in which to prevent this is through the incorporation of support structures into the floor. However, this adds additional weight which is not desirable in aircraft. Accordingly, the large forces may be diffused, thereby lowering the pressure exerted in the floor by utilizing an air bag 102 with a large surface area. In the preferred embodiment, the air bag 102 has a surface area greater than two (2) square feet. Alternatively, a dual level hybrid air bag may be deployed in two ways depending upon the severity of the impact.

The air bag 102 may be formed from any suitably strong and lightweight material capable of withstanding the large forces generated in an aircraft crash. In the exemplary embodiment, the air bag 102 comprises nylon. Nylon is strong and abrasion resistant, and ages well under a wide range of environmental conditions. In addition, nylon does not require any coatings, thereby making the air bag lighter, reducing cost, and making recycling easier.

As the air bag 102 begins to inflate, it exerts pressure on the air bag module casing 108. The casing 108 may have a sufficiently low tensile strength such that the force of the expanding air bag 102 bearing against it causes the air bag 102 to break through. The air bag module casing 108 may be formed from a variety of materials which are capable of protecting the air bag 102 and the air bag inflator unit 106 before and during deployment so as not to impede the air bag's escape, and over the useful life of the air bag module 100. The air bag module 100 may have a useful life of ten (10) years and preferably fifteen years (15) or greater. In the exemplary embodiment, the air bag casing 108 comprises polyurethane.

The exemplary air bag 102 design provides for full surface contact with the floor to absorb potential forces without structural reinforcement of the aircraft, i.e., the floor. It also provides energy attenuation in the vertical, fore/aft, and lateral direction. The energy absorbing stroke should be the maximum obtainable in the space between the seat bottom and the floor of the aircraft. Accordingly, the air bag 102 should completely fill the space between the seat and the floor and then deflate at a controllable rate. Because the space between seats and floors may vary, different size air bags may be utilized. Alternatively, the tethers discussed above may be utilized to ensure that one size air bag is deployable under any seat.

Air bag deflation may be controlled by precise venting of the gas in the air bag 102. As the occupant 16 and the seat 10 plunge into the air bag 102, the gas is vented through vents strategically positioned to discharge the gas away from the seat occupant 16 to prevent a possible burn injury. In the exemplary embodiment, the air bag 102 comprises one or more vents or gas control valves 118 to discharge the gas at a controlled rate.

The capability of the energy attenuation system to protect an occupant is dependent upon the seat remaining securely attached to the aircraft structure throughout the crash sequence.

Although shown and described are what is believed to be the more practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. An energy attenuation system for an aircraft frame comprising:
   a seat securely attached to said aircraft frame; and
   an air bag module, including an air bag secured below said seat and an airbag inflator for deploying said air bag below the seat for absorbing energy.

2. An energy attenuation system for aircraft seating comprising:
   a seat; and
   an air bag module, including an air bag secured below said seat for absorbing energy, an air bag inflator unit for deploying said air bag below said seat for absorbing energy and a casing housing the air bag inflator unit.

3. The energy attenuation system according to claim 2, wherein the air bag inflator unit comprises:
   (a) a squib including an ignitable charge;
   (b) a booster compartment including a booster material, the booster compartment positioned in proximity to the squib;
   (c) a gas generant compartment including a gas generant material, the gas generant compartment positioned in proximity to the booster compartment; and
   (d) a filter positioned between the gas generant compartment and the air bag, the filter filtering the gases generated in the gas generant compartment prior to inflating the air bag.

4. The energy attenuation system according to claim 3, wherein the squib comprises a percussion cap detonator.

5. The energy attenuation system according to claim 3, wherein the gas generant compartment comprises a diffuser geometry.

6. The energy attenuation system according to claim 1, wherein the air bag comprises at least one vent for discharging the gas in the air bag at a controllable rate.

7. An energy attenuation system for aircraft seating comprising:
   a seat;
   a sensor positioned in proximity to the seat, the sensor detecting an impulse force and transmitting a crash signal in response thereto; and
   an air bag module, including an air bag positioned and deployable below the seat for absorbing energy, the air bag module being responsive to the crash signal from the sensor.

8. The energy attenuation system according to claim 7, wherein the sensor comprises a shear-pin sensor, the shear-pin sensor including a shear pin, a pre-loaded bias spring, a firing pin, and a housing, the shear pin being connected at a first end to the seat and at a second end to the firing pin, the firing pin being held in a fixed position by the shear pin in opposition to the force of the pre-loaded bias spring, and wherein the impulse force causes the shear pin to separate from the seat, thereby releasing the firing pin.

9. The energy attenuation system according to claim 7, wherein the sensor transmits a crash signal to the air bag module upon detection of an impulse force of 3 g or greater.

10. The energy attenuation system according to claim 7, wherein the air bag module comprises an air bag inflator unit and the air bag.

11. The energy attenuation system according to claim 10, wherein the air bag inflator unit comprises:
    (a) a squib including an ignitable charge;
    (b) a booster compartment including a booster material, the booster compartment positioned in proximity to the squib;
    (c) a gas generant compartment including a gas generant material, the gas generant compartment positioned in proximity to the booster compartment; and
    (d) a filter positioned between the gas generant compartment and the air bag, the filter filtering the gases generated in the gas generant compartment prior to inflating the air bag.

12. The energy attenuation system according to claim 11, wherein the squib comprises a percussion cap detonator.

13. The energy attenuation system according to claim 11, wherein the gas generant compartment comprises a diffuser geometry.

14. The energy attenuation system according to claim 7, wherein the air bag comprises at least one vent for discharging the gas in the air bag at a controllable rate.

15. A method for attenuating forces imparted to an occupant of an aircraft during a crash comprising:
    positioning an air bag module below a seat in the aircraft;
    inflating an air bag of the air bag module at predetermined rates and pressures upon the detection of a collision; and
    deflating the air bag at a controllable rate to absorb the forces.

16. An energy attenuation system for aircraft seating mounted on an aircraft frame comprising:
    a seat; and
    an air bag module, the air bag module including an air bag secured below said seat and an air bag inflator for deploying said air bag below the seat for absorbing energy.

17. A method for attenuating forces imparted to an occupant of an aircraft during a crash comprising:
    securing an air bag below a seat;
    inflating said air bag disposed below said seat of an aircraft at predetermined rates and pressures upon detection of an acceleration force acting upon the seat; and
    deflating the air bag at a controllable rate to absorb the force.

18. A method according to claim 17 wherein the acceleration force includes a force of between about 3 g to about 6 g.

19. The method according to claim 17 wherein deflation of the air bag is initiated within 130 milliseconds or less of detection of the acceleration force.

20. The method according to claim 17 wherein the air bag is at least halfway deflated within 150 milliseconds or less of detection of the acceleration force.

* * * * *